(12) United States Patent
Blohm et al.

(10) Patent No.: US 10,510,131 B2
(45) Date of Patent: Dec. 17, 2019

(54) RETURN MAIL SERVICES

(71) Applicants: Nicole Blohm, Mount Pleasant, SC (US); Stephen Cousins, Nashville, TN (US)

(72) Inventors: Nicole Blohm, Mount Pleasant, SC (US); Stephen Cousins, Nashville, TN (US)

(73) Assignee: RICOH COMPANY, LTD., Tokyo (JP)

( * ) Notice: Subject to any disclaimer, the term of this patent is extended or adjusted under 35 U.S.C. 154(b) by 98 days.

(21) Appl. No.: 15/914,549

(22) Filed: Mar. 7, 2018

(65) Prior Publication Data
US 2019/0279325 A1 Sep. 12, 2019

(51) Int. Cl.
*G06Q 50/26* (2012.01)
*G06K 9/32* (2006.01)
*G06F 16/583* (2019.01)
*G06F 3/12* (2006.01)

(52) U.S. Cl.
CPC ......... *G06Q 50/26* (2013.01); *G06F 16/5846* (2019.01); *G06K 9/325* (2013.01); *G06F 3/1243* (2013.01); *G06K 2209/01* (2013.01)

(58) Field of Classification Search
None
See application file for complete search history.

(56) References Cited

U.S. PATENT DOCUMENTS

| 2002/0042815 A1* | 4/2002 | Salzfass | H04L 51/14 709/206 |
| 2002/0147731 A1* | 10/2002 | Seestrom | B07C 3/12 |
| 2002/0168090 A1* | 11/2002 | Bruce | G06K 9/033 382/101 |
| 2003/0085162 A1* | 5/2003 | Daniels, Jr. | B07C 3/14 209/584 |

(Continued)

*Primary Examiner* — Delomia L Gilliard
(74) *Attorney, Agent, or Firm* — Hickman Palermo Becker Bingham LLP

(57) ABSTRACT

In an embodiment, an apparatus comprises one or more processors and one or more memories communicatively coupled to the one or more processors and storing instructions which, when processed by the one or more processors, cause: receiving a digital image of undeliverable mail and storing the digital image in a first database; causing data to be extracted from the digital image using Optical Character Recognition (OCR) or by processing encoded data; in response to causing data to be extracted from the digital image, identifying a sender of the undeliverable mail and a recipient of the undeliverable mail based on the data; causing additional data to be requested from two or more second databases based on the data extracted from the digital image; in response to delivery of the undeliverable mail and using the additional data requested from the two or more second databases, determining delivery hit rates for each of the two or more second databases; assigning, based on a highest hit rate of the delivery hit rates, at least one of the two or more second databases as a primary database from which additional data is requested; and in response to assigning the at least one of the two or more second databases as the primary database, causing additional data to be requested from the primary database.

20 Claims, 3 Drawing Sheets

(56) References Cited

U.S. PATENT DOCUMENTS

| | | | |
|---|---|---|---|
| 2003/0182017 A1* | 9/2003 | O'Donohue | B07C 3/00 700/224 |
| 2003/0191651 A1* | 10/2003 | Hungerpiller | B07C 3/18 705/401 |
| 2009/0057207 A1* | 3/2009 | Orbke | B07C 3/14 209/584 |
| 2010/0145504 A1* | 6/2010 | Redford | B07C 3/14 700/227 |
| 2014/0189018 A1* | 7/2014 | Nawaz | G06Q 50/32 709/206 |
| 2014/0298114 A1* | 10/2014 | Aoki | G06F 11/2028 714/48 |
| 2019/0188544 A1 | 6/2019 | Cousins | |

* cited by examiner

RETURN MAIL SERVICES

FIELD

The technical field of the present disclosure relates to improved methods, systems, computer software, and/or computer hardware in the field of return mail services. The disclosure relates more specifically to improved computer-implemented methods and systems for analyzing undeliverable as addressed mail information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When individuals change residences, an updated address is often needed to ensure that mail is properly delivered to the recipient. However, when a recipient moves without providing an updated address to a sender, mail that is sent to the old address cannot be delivered. Undeliverable as Addressed (UAA) mail is returned to the sender in the case of first class mail, or otherwise redirected. Subsequently, the sender and/or redistribution facilities often waste significant network bandwidth, computer processing resources, and memory searching for and attempting to compile updated recipient addresses. When these searches fail, not only are senders unable to convey promotions and outstanding bills to recipients, but recipients also miss promotions and suffer credit score decreases due to unpaid bills.

SUMMARY

The appended claims may serve as a summary. In an embodiment, an apparatus comprises one or more processors and one or more memories communicatively coupled to the one or more processors and storing instructions which, when processed by the one or more processors, cause: receiving a digital image of undeliverable mail and storing the digital image in a first database; causing data to be extracted from the digital image using Optical Character Recognition (OCR) or by processing encoded data; in response to causing data to be extracted from the digital image, identifying a sender of the undeliverable mail and a recipient of the undeliverable mail based on the data; causing additional data to be requested from two or more second databases based on the data extracted from the digital image; in response to delivery of the undeliverable mail and using the additional data requested from the two or more second databases, determining delivery hit rates for each of the two or more second databases; assigning, based on a highest hit rate of the delivery hit rates, at least one of the two or more second databases as a primary database from which additional data is requested; and in response to assigning the at least one of the two or more second databases as the primary database, causing additional data to be requested from the primary database.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. GENERAL OVERVIEW
II. SYSTEM ARCHITECTURE
   A. Processing and Management System
   B. Network
   C. Services
III. PROCEDURAL OVERVIEW
IV. IMPLEMENTATION MECHANISMS

I. General Overview

According to various embodiments, computer-implemented apparatus, methods, and systems are provided that enable improved return mail services that may be provided on-premise and through a central delivery system. These return mail services include receiving and storing scanned images of UAA mail and extracting data by performing OCR or scanning encoded data, identifying a sender and a recipient of the UAA mail, checking two or more address correction databases for updated addresses of the recipient, determining delivery hit rates for each of the two or more address correction databases, assigning, based on a highest hit rate, at least one of the two or more address correction database as a primary database from which additional data is requested, and causing additional data to be requested from the primary database.

The services may also include causing printing of the updated address of the recipient on a piece of mail using a printing device associated with the sender. In some embodiments, the services may include causing the updated address of the recipient to be encoded at a computing device associated with the sender to generate encoded updated addresses, such as barcodes, Facing Identification Marks (FIM), Intelligent Mail Barcodes (IMB), or other encoded data, and subsequently printing the encoded updated address on a piece of mail using a printing device associated with the sender.

Technical benefits include improved computer and system efficiency by shifting the computer storage, memory, and processing burdens of determining updated mailing addresses away from senders. This decreases the excessive use of network bandwidth, as well as decreases the use of processing resources, such as CPU usage, and memory that the computing systems of the sender would otherwise waste on searching for updated mailing addresses. The distributed system architecture also has the added benefit of distributing processing resources such that overburdening a single computer is avoided. Moreover, determining and assigning a primary database based on hit rates has the benefit of improving the accuracy of first-time corrections, thereby decreasing the subsequent use of computing resources for repeated and wasteful resending of mail.

II. System Architecture

Figure 1:
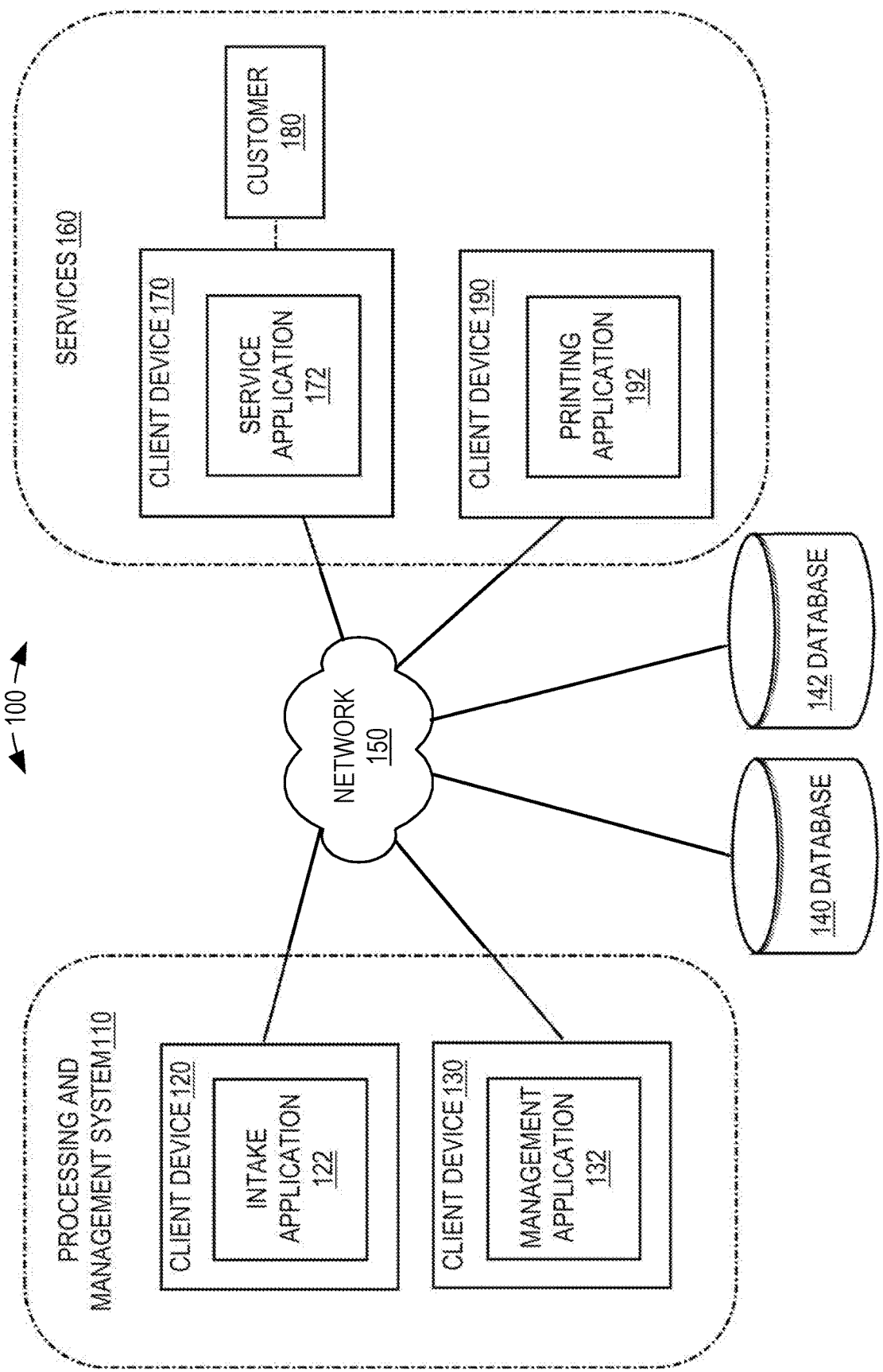
FIG. 1 depicts a networked computer system.

FIG. 1 depicts a networked computer system 100. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 depicts only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between computing devices of a processing and management system 110 and services 160. Therefore, each element of 110 and 160 of FIG. 1 may represent or be associated with one or more computers that host or execute processes that provide the functions and operations that are described further herein in connection with the processing and management system 110 or services 160. The networked computer system 100 is not limited the particular elements depicted in FIG. 1 and may include fewer or additional elements depending upon a particular implementation.

A. Processing and Management System

Processing and management system 110 may be a system configured to provide intake, processing, analysis, and management of UAA mail. Embodiments are depicted in the figures and described herein in the context of a single processing and management system 110 for the purposes of explanation, but any number of processing and management systems may be used.

The processing and management system 110 may feature a client device 120. In an embodiment, the client device 120 may be any type of client device 120 or a combination of client devices, including but not limited to a display screen, a workstation, a personal computer, a laptop computer, a tablet computing device, a personal digital assistant, or a smartphone. Client device 120 may equipped with or be associated with a scanner, camera, or any other device configured to capture a digital image. The client device 120 may also be a specialty device configured to open, prepare, and scan envelopes and/or the inner contents of envelopes. Although embodiments are depicted in the figures and described herein in the context of a single client device 120, embodiments are not limited to this example and any number of client devices may be used.

The client device 120 may execute an intake application 122, which allows a user to process UAA mail in association with the camera, scanner, or other image capture device. For example, client device 120 may be an integrated workstation, scanner, and envelope opener. Intake application 122 may be a software application that causes the integrated workstation, scanner, and envelope opener to scan the envelope, open the envelope, and/or scan the inner contents of the envelope. In another embodiment, client device 120 may be a laptop or desktop connected to a scanner. Intake application 122 may be a scanner software application installed on the laptop or desktop that enables a user to access and control the scanner and capture a digital image of the outer envelope and/or the inner contents of the UAA. In another embodiment, the client device 120 may be a smartphone that features a camera. Intake application 122 may be a scanner application installed on the smartphone that enables a user to access and control the camera to capture a digital image of outer envelope and/or inner contents of the UAA mail.

The processing and management system 110 may also feature a client device 130. In an embodiment, the client device 130 may be any type of client device 130 or a combination of client devices, including but not limited to one or more server computers. Although embodiments are depicted in the figures and described herein in the context of a single client device 130, embodiments are not limited to this example and any number of client devices may be used. For example, client device 130 may be multiple computers acting in conjunction with a web server to receive digital images of envelopes and/or inner contents of the UAA mail, check for updated mailing addresses from third-party databases, and store, categorize, organize, and display the digital images in association with their respective updated mailing addresses.

The client device 130 may execute management application 132. Management application 132 may receive and store the digital images of envelopes and/or the inner contents of the UAA mail and any relevant data in a database associated with the client device 130. In an embodiment, the management application 132 may also receive additional updated data related to the UAA mail from third party database, and store, categorize, organize the digital images and updated data for subsequently user access through a customer portal, as further described herein.

B. Database

In an embodiment, updated mailing addresses may be retrieved from database 140, 142. As used herein, the term "database" refers to a corpus of data, organized or unorganized, in any format, with or without a particular interface for accessing the corpus of data. Database 140 and database 142 may be two or more third-party address correction databases, such as the National Change of Address (NCOA) database and a Proprietary Change of Address (PCOA) database. The NCOA database may be, for example, the federal postal service's database for mail forwarding and address changes. A PCOA database may be any private database that maintains a record of addresses, such as a bank database, or any other private entity's database. Although embodiments are depicted in the figures and described herein in the context of two or more databases, embodiments are not limited to this example and any number of databases may be used. For example, the NCOA database, a PCOA database associated with a bank, and a PCOA associated with a private lender may all be used. Any number of address correction databases may be used.

C. Network

Network 150 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 150 and the disclosure presumes that all elements of FIG. 1 are communicatively coupled via network 150. The various elements depicted in FIG. 1 may also communicate with each other via direct communications links that are not depicted in FIG. 1 for purposes of explanation.

D. Services

Services 160 may be return mail services that are provided to customers. In some embodiments, a client device 170 may be associated with a customer 180 such that the customer may access a return mail services portal through a service application 172 executed on the client device 170. The design of networked computer system 100 is such that services 160 may be delivered centrally and on-premise, in some embodiments. The client device 170 may be any type of client device, including but not limited to a workstation, a personal computer, a laptop computer, a tablet computing device, a personal digital assistant, or a smartphone. The service application 172 may be implemented by any number and types of processes executing on client device 170. For example, the service application 172 may be a web browser configured to access a web-based portal or website that is hosted on a remote server, such as client device 130. In another embodiment, the service application 172 may be a specialized software application installed locally on the client device 170.

Client device 190 may also be any type of client device, including but not limited to a workstation, a personal computer, a laptop computer, a tablet computing device, a personal digital assistant, a smartphone, or a printer. Client device 190 may be, for example, a client device associated with or integrated with a printer, such as a third-party partner printing device, that executes a printing application 192 for printing mail. In some embodiments, the printing application 192 may be configured to encode data and generate, for example, a barcode, FIM, IMB, or any other representation of encoded data.

III. Procedural Overview

Figure 2:
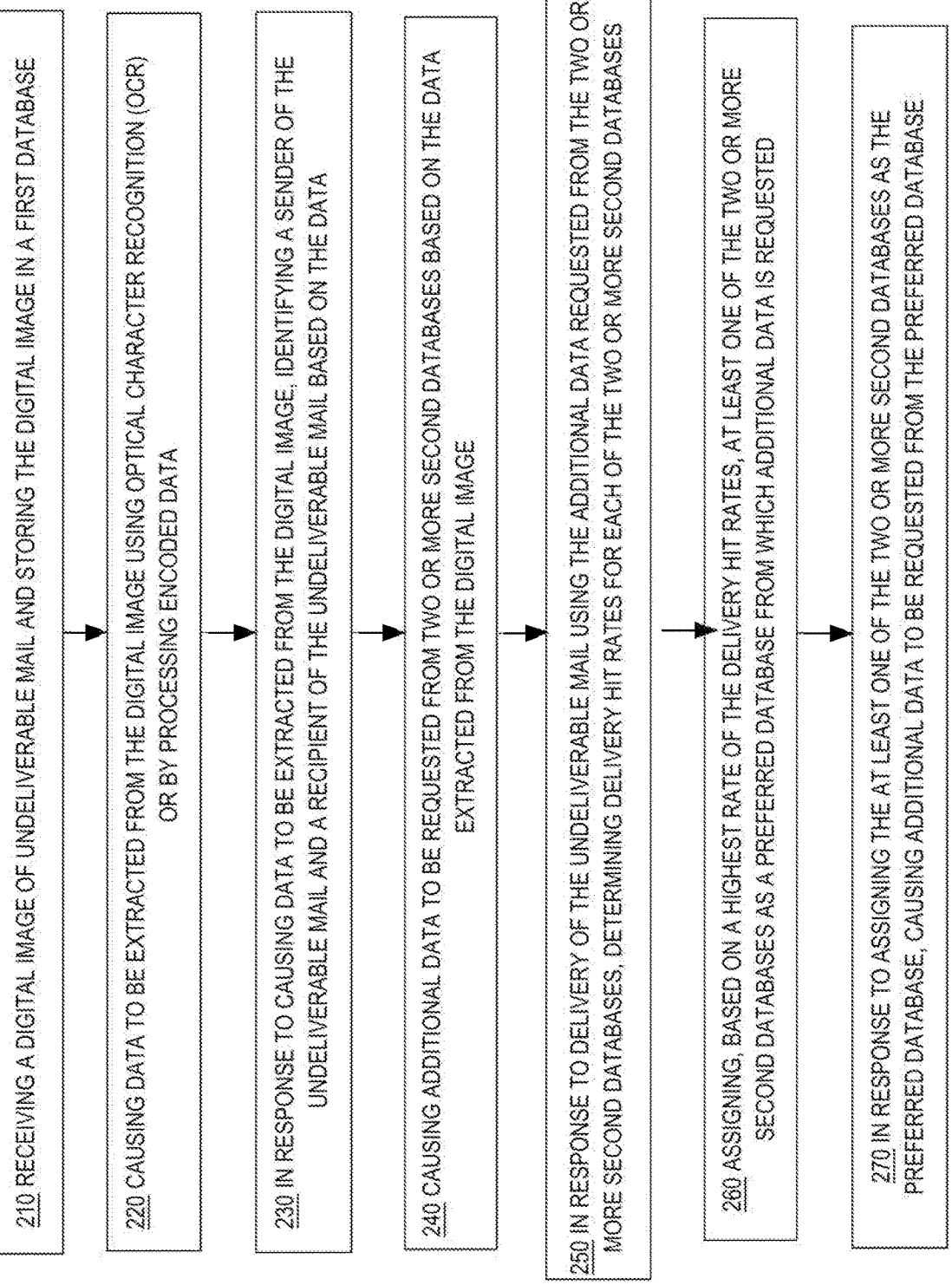
FIG. 2 is a flow diagram that depicts a method or algorithm for return mail services.

FIG. 2 is a flow diagram that depicts a method or algorithm for return mail services. The method 200 utilizes processing and management system 110 to scan UAA mail envelopes and/or content and store the scanned information, for example, by uploading the scanned information to a cloud server for storage. In an embodiment, the computer system may perform OCR to determine a recipient of the UAA mail and check third-party databases for an updated address. In another embodiment, the computer system may process encoded data to determine a recipient of the UAA mail and check third-party databases for an updated address. The encoded data may be, for example, a FIM, a barcode, a IMB, Quick Response (QR) matrix barcode, or any other optical representation or encoded representation of data. In another embodiment, a combination of both OCR and encoded data processing may be used. In an embodiment, the computer system may also perform OCR and/or process encoded data to determine a sender of the UAA mail and use the sender's information to classify the UAA mail into action queues. In an embodiment, the computer system may also organize and display the envelope and content images, any data associated with the envelope and content images, as well as updated addresses to customers through a GUI.

At step 210, the client device 130 receives a digital image of undeliverable mail and stores the digital image in a first database. Specifically, a server may receive a scanned image of envelopes and/or the inner contents of envelopes for UAA mail from client device 120. In an embodiment, client device 120 may be a high-volume, integrated workstation, scanner, and envelope opener that generates digital images of envelopes and/or inner content by using an intake application 122 to scan envelopes, open envelopes, and/or scan the inner contents of the envelopes. In an embodiment, intake application 122 may also send the digital images to client device 130. Once the digital images of UAA mail are received by client device 130, the client device 130 may store the digital images in a database associated with the client device 130.

At step 220 the client device 130 may cause data to be extracted from the digital image using optical character recognition (OCR). In some embodiments, the client device 130 may execute a local OCR service to extract data from the envelope and/or inner contents. In another embodiment, the client device 130 may coordinate with third party servers that host OCR services and provide the extracted data to the client device 130. In another embodiment, the client device 130 may cause data to be extracted by processing encoded data. The encoded data may be any type of computer-readable data, such as a FIM, an IMB, a barcode, QR matrix barcode, or any other type of encoded data. For example, the encoded data may be a two-dimensional barcode that stores unique user identification (UID) information. When the barcode is scanned, the client device 130 may match the UID to a UID stored in a database that is associated with the client device 130. The database may be, for example, a customer database storing the UID and any associated mailing information. In some embodiments, the client device 130 may process the encoded data locally to match the UID and extract the associated data. In another embodiment, the client device 130 may coordinate with third party devices that process the encoded data, extract any associated data, and provide the extracted data to the client device 130.

At step 230, after client device 130 causes data to be extracted from the digital image, a sender and a recipient may be identified based on the data. The extracted data may be, for example, the name and address of the recipient, the name and address of the sender (return address), the mail class, and data representing the inner contents of the envelope. The name or address of the sender may designate a specific department that the UAA mail came from, which may indicate a specific type of mail. For example, some senders may have a department dedicated to credit cards that is associated with a particular post office box (P.O. Box) and a separate department dedicated to motor finance that is associated with another P.O. Box. Any number of departments and any number of specific types of mail may be identified. In another embodiment, the type of mail may include, for example, a bill, a general advertisement, a specific promotional offer, or any other type of mail. The sender and/or the type of mail may subsequently be used to assign mail into action queues that allow the sender to evaluate recipient addresses for updates and correction. The name and address of the recipient may be used to check third-party databases for updated recipient addresses, as further described herein.

At step 240, the client device 130 may cause additional data to be requested from two or more second databases based on the data extracted from the digital image. Database 140, 142 may be third-party address correction databases such as the NCOA database associated with the United States Postal Service and/or a PCOA database associated with private entities. Individuals who change residences sometimes request mail forwarding or update their address with various private entities, such as their bank, utility provider, or any other entity. Mail forwarding is recorded in the NCOA database while requests to various private entities are recorded in PCOA databases.

In an embodiment, the step of 240 may include checking the NCOA database and/or PCOA databases for updated mailing addresses. For example, after client device 130 determines the name of an intended recipient based on the name extracted from the digital image of the envelope, client device 130 may subsequently obtain an updated address for the intended recipient from the NCOA database and/or PCOA databases, such as database 140, 142. In an embodiment, the client device 130 may obtain the updated address directly from database 140, 142. In another embodiment, the client device 130 may coordinate with third party servers that request updated address from database 140, 142 and provide the updated address to the client device 130.

In an embodiment, client device 130 may cross reference the name and/or address of the intended recipient obtained from the extraction of step 230 with names and/or addresses stored in database 140, 142. If the cross-referenced name and/or address is associated with a database entry for an updated address, then client device 130 may request the updated address. In an embodiment, the client device 130 may be configured to track updates to the database 140, 142. For example, client device 130 may be configured to monitor the database 140, 142 for address updates that correspond to any recipients stored in a sender's mailing list database. Upon receiving a notification that a relevant entry has been updated in database 140, 142, client device 130 may cause the additional data to be requested automatically.

All updated mailing addresses may be stored in a database associated with client device 130 and associated with action queues that are generated by the management application 132. For example, the client device 130 may cause the digital image, the data, the additional data, and one or more options for the undeliverable mail to be displayed using a GUI. In an embodiment, client device 130 may host a web-based portal for information and options related to UAA for user access. For example, a customer 180 may use a client device 170 and a service application 172 to login and access a return mail service portal. The customer 180 may be, for example, a sender, an employee or agent of the sender, or anyone associated with the sender. The service application 172 may be configured to access and display the portal in a display screen of the client device 170.

The return mail service portal may enable a user to access the digital image, the data corresponding to the old address, and the additional data corresponding to the new address. The return mail services portal may be configured to use the sender's address that was obtained at step 230 to automatically classify the digital image of the UAA mail and any data associated with the digital image into action queues. These action queues may be organized by sender or department such that UAA mail related only to specific senders or departments may be viewed and acted upon. The action queues may also be organized by the type of mail, or a by a combination of the sender, department, and the type of mail.

The portal may also provide options for correcting or replacing the recipient address. For example, in an embodiment, the portal may feature an option for transferring or exporting the additional data corresponding to the new address to a sender's enterprise resource planning (ERP) or customer relationship management (CRM) systems such that the recipient's address may be updated in the sender's databases. This would allow the sender to send a piece of mail to the corrected address during their next mailing cycle. In another embodiment, the portal may feature an option for transferring or exporting the additional data corresponding to the new address to a sender's call center for subsequent follow-up. In another embodiment, the portal may feature an option to forward the UAA mail to the new address.

In another embodiment, the portal may feature an option for transporting or exporting the additional data corresponding to the updated recipient address to client device 190 for subsequent printing using printing application 192. For example, client device 190 may be associated with a sender or customer's database that stores a digital version and/or the contents of the undeliverable mail. Client device 190 may subsequently access the customer database and re-print the undeliverable mail with the updated recipient address using a printing device. In an embodiment, client device 190 may also be configured to encode the recipient information. The encoded data may be any type of computer-readable data, such as a FIM, an IMB, a barcode, QR matrix barcode, or any other type of encoded data. For example, the encoded data may be a two-dimensional barcode that represents the recipient information, including the updated address. Subsequently, client device 190 may re-print the undeliverable mail with the barcode representing the updated recipient address.

In an embodiment, one or more of the example options discussed herein may be automatically implemented. For example, the client device 130 may be configured to automatically cause the transferring or exporting of the data representing the new address to the ERP and/or CRM systems to update the address in the sender's database. In another embodiment, the client device 130 may be configured to automatically cause transferring or exporting of the data representing the new address to a call center or a client device 190 for printing and mailing. The client device 130 may also be configured to automatically cause forwarding the UAA mail to the new address.

All action queues and options available may be customizable to fit customer needs and are, therefore, not limited to the embodiments described above. For example, one action queue may be configured with a first set of actions or options to be performed while a second action queue may be configured with a second set of actions or options to be performed.

At step 250, after delivery of the otherwise undeliverable mail using the updated address, the client device 130 may determine delivery hit rates for each of the two or more second databases. A delivery hit rate is a ratio or percentage of the number of successful redeliveries divided by the total number of redeliveries. For example, a particular PCOA database may have successfully corrected addresses and resulted in the successful redelivery of 200 pieces of mail out of 2000 total pieces of undeliverable mail, generating a delivery hit rate of 0.1 or 10%.

In an embodiment where client device 190 has reprinted and sent the undeliverable mail with the corrected or updated recipient address, client device 130 may operate in conjunction with one or more other devices to track the delivery of the corrected piece of mail. In another embodiment, client device 130 may operate in conjunction with a sender to evaluate how many pieces of corrected mail are not delivered and require remailing. For example, client device 130 may track and evaluate the number of corrected pieces of mail that are returned to the sender or otherwise redirected. Subsequently client device 130 may calculate the delivery hit rate to evaluate the accuracy of each database 140, 142 for address correction. The higher the delivery hit rate, the more accurate the database 140, 42 is in correcting addresses.

In an embodiment, the delivery hit rate of each database 140, 142 may be calculated in relation to each sender. Some address correction databases may be more accurate for different types of senders. For example, a PCOA database associated with a financial institution may have more accurate address updates for a sender in the financial sector than other non-financial PCOA databases. In other embodiments, the delivery hit rate of each database 140, 142 may be calculated as a whole, in relation to all senders. For example, a PCOA database that pulls data from a number of other PCOA databases as well as the NCOA may have the most accurate and up-to-date addresses.

At step 260, the client device 130 may assign, based on a highest hit rate of the delivery hit rates, at least one of the two or more second databases as a primary database from which additional data is requested. Specifically, client device 130 may rank the delivery hit rates of each database 140, 142 for each sender. The database 140, 142 with the highest hit rate may be designated as the primary database for that sender. Thereafter, any updated recipient addresses may be requested from the primary database. For example, database 140 may have a delivery hit rate of 0.37, or 37% for recipients of a particular sender, while database 142 may have a delivery hit rate of 0.29, or 29% for recipients of the same sender. Client device 130 may rank the delivery hit rates to determine that database 140 has a higher delivery hit rate at 37% than database 142 at 29%. Thereafter, database 140 may be designated as the primary database for requesting updated recipient information from, for this particular sender. This allows for the optimization of database referencing for each sender.

Although embodiments described herein relate to calculating hit rates per database on a sender-by-sender basis, embodiments are not limited to this example. In an embodiment, client device 130 may calculate a total hit rate for each database 140, 142 across all senders, determine a highest total hit rate among all the third-party databases, and assign the database with the highest total hit rate as the primary database for all senders.

Moreover, while embodiments are depicted in the figures and described herein in the context of comparing delivery hit rates from two databases, embodiments are not limited to this example and delivery hit rates from any number of databases may be compared and ranked. For example, the delivery hit rate for the NCOA database for a particular sender may be 23%, the delivery hit rate for a credit card PCOA database for a particular sender may be 25%, and the delivery hit rate for a bank PCOA database for a particular sender may be 29%. Client device 130 may rank all three delivery hit rates and determine that the highest is 29%. Since the bank PCOA database is the most accurate, the bank PCOA database may be designated as the primary database.

At step 270, in response to assigning the at least one of the two or more second databases as the primary database, client device 130 may cause additional data to be requested from the primary database. In the example above, since the PCOA database has been determined to have the highest hit rate and is designated as the primary database, updated addresses may be requested from the primary PCOA database more frequently than any other database. The frequency with which the primary database is used compared to other databases may be customized.

In an embodiment, the request for additional data may automatically be defaulted to a primary database having the highest hit rate. In another embodiment, the request for additional data may automatically be defaulted to a primary database having a particular hit rate that is designated as high enough for automatic requesting. For example, statistical analysis may be conducted to determine that databases with a hit rate of 60% or above are extremely accurate relative to hit rates of 59% or below. Therefore, any database with a hit rate of 60% or above may be designated as the primary database and automatically used for address update checks. In another embodiment, the request for additional data may automatically be defaulted to a primary database with a hit rate of a certain percentage higher than any other database. For example, if a database has a hit rate that is 10% higher than any other database, then that particular database may be designated as the primary database and automatically used for address update checks.

In an embodiment, the ranking of delivery hit rates determined at step 260 may be used to set a ranked hierarchy of databases, which may be used to determine an order by which additional data is requested. In the example above, the client device 130 may designate the bank PCOA database with a delivery hit rate of 29% as the primary database, the credit card PCOA database with a delivery hit rate of 25% as the secondary database, and the NCOA database with a delivery hit rate of 23% as the tertiary database. In an embodiment, the client device 130 may request updated addresses from the primary database first, the secondary database second, the tertiary database third, and so forth. If no updated address is available at any given database 140, 142, the client device 130 may check the remaining databases in sequential order based on the ranked hierarchy.

In another embodiment, the client device 130 may request updated addresses from the top two or three databases in the ranked hierarchy and cross reference the data received to determine the most up-to-date address. For example, the client device 130 may receive additional data from the top three ranked databases and evaluate the data for the most up-to-date address. The most up-to-date address may then be presented in an action queue for subsequent correction. Although embodiments described herein relate to cross referencing data from the top two or three databases in the ranked hierarchy, embodiments are not limited to this example and any number of databases in the ranked hierarchy may be used.

Using the foregoing techniques, programmed computers may process, store, organize, optimize, display, and manage mailing information in an improved return mail service system that decreases wasteful use of processing resources and increases the efficiency of the overall system. Traditional techniques without the improved techniques described above often result in wasted network bandwidth, computer processing resources, and memory in unsuccessful searches for updated recipient addresses. When these searches fail, not only are senders unable to convey promotions and outstanding bills to recipients, but recipients also miss promotions and suffer credit score decreases due to unpaid bills.

The foregoing techniques provide for an improvement in computer and system efficiency by decreasing the excessive use of senders' network bandwidth and decreasing the use of senders' processing resources on resource-intensive and often incomplete searches, by providing a centralized system that compiles and optimizes updated return mail information on behalf of the sender. For example, the approaches described above may reduce the amount of processing resources that a sender uses to search for a recipient's new address, thereby reducing the amount of computational and storage resources wasted in trying to update the address. Moreover, the optimization of updating addresses using delivery hit rates increases both efficiency and accuracy of the mailing process, thereby decreasing the wasteful and unnecessary use of additional processing resources in re-mailing attempts. As a result of this increase in computer and system efficiency, customer satisfaction and ROI increase.

V. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
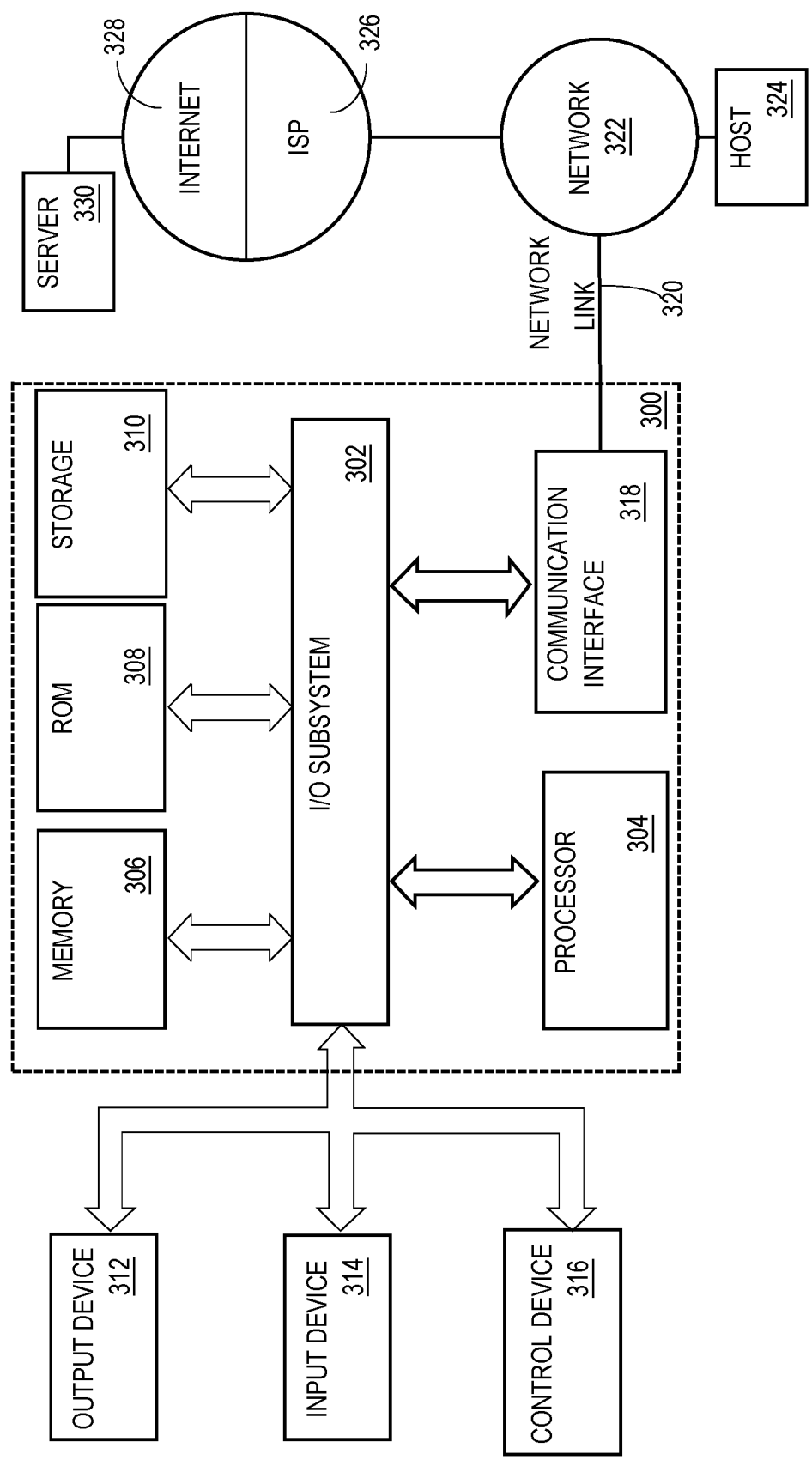
FIG. 3 is a block diagram that depicts an example computer system upon which embodiments may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. An apparatus featuring an improvement in data processing and computer efficiency, comprising:
   one or more processors; and
   one or more memories communicatively coupled to the one or more processors and storing instructions which, when processed by the one or more processors, cause:
      receiving a digital image of undeliverable mail and storing the digital image in a first database;
      causing data to be extracted from the digital image using Optical Character Recognition (OCR) or by processing encoded data;
      in response to causing data to be extracted from the digital image, identifying a sender of the undeliverable mail and a recipient of the undeliverable mail based on the data;
      causing additional data to be requested from two or more second databases based on the data extracted from the digital image;
      in response to delivery of the undeliverable mail, and using the additional data requested from the two or more second databases, determining delivery hit rates for each of the two or more second databases;

assigning, based on a highest hit rate of the delivery hit rates, at least one of the two or more second databases as a primary database from which additional data is requested; and in response to assigning the at least one of the two or more second databases as the primary database, causing additional data to be requested from the primary database.

2. The apparatus of claim 1, wherein one or more memories further store additional instructions which, when processed by the one or more processors, cause:

causing printing of the additional data on a piece of mail using a printing device associated with the sender.

3. The apparatus of claim 1, wherein one or more memories further store additional instructions which, when processed by the one or more processors, cause:

causing the additional data to be encoded at a computing device associated with the sender to generate encoded additional data; and causing printing of the encoded additional data on a piece of mail using a printing device associated with the sender.

4. The apparatus of claim 1, wherein the two or more second databases comprise two or more address correction databases.

5. The apparatus of claim 1, wherein the data from the digital image comprises a recipient address, and wherein the additional data from the two or more second databases comprises an updated recipient address.

6. The apparatus of claim 1, wherein one or more memories further store additional instructions which, when processed by the one or more processors, cause:

receiving a notification that the additional data to be requested from the two or more second databases has been updated; and wherein causing the additional data to be requested is done automatically in response to receiving the notification.

7. The apparatus of claim 1, wherein determining delivery hit rates for each of the two or more second databases comprises calculating a ratio of successful deliveries to total delivery attempts based on the additional data.

8. One or more non-transitory computer-readable media storing instructions which, when processed by one or more processors, cause:

receiving a digital image of undeliverable mail and storing the digital image in a first database;

causing data to be extracted from the digital image using Optical Character Recognition (OCR) or by processing encoded data;

in response to causing data to be extracted from the digital image, identifying a sender of the undeliverable mail and a recipient of the undeliverable mail based on the data;

causing additional data to be requested from two or more second databases based on the data extracted from the digital image;

in response to delivery of the undeliverable mail, and using the additional data requested from the two or more second databases, determining delivery hit rates for each of the two or more second databases;

assigning, based on a highest hit rate of the delivery hit rates, at least one of the two or more second databases as a primary database from which additional data is requested; and in response to assigning the at least one of the two or more second databases as the primary database, causing additional data to be requested from the primary database.

9. The one or more non-transitory computer-readable media of claim 8, further comprising additional instructions which, when processed by the one or more processors, cause:

causing printing of the additional data on a piece of mail using a printing device associated with the sender.

10. The one or more non-transitory computer-readable media of claim 8, further comprising additional instructions which, when processed by the one or more processors, cause:

causing the additional data to be encoded at a computing device associated with the sender to generate encoded additional data; and causing printing of the encoded additional data on a piece of mail using a printing device associated with the sender.

11. The one or more non-transitory computer-readable media of claim 9, wherein the two or more second databases comprise two or more address correction databases.

12. The one or more non-transitory computer-readable media of claim 9, wherein the data from the digital image comprises a recipient address, and wherein the additional data from the two or more second databases comprises an updated recipient address.

13. The one or more non-transitory computer-readable media of claim 9, wherein one or more memories further store additional instructions which, when processed by the one or more processors, cause:

receiving a notification that the additional data to be requested from the two or more second databases has been updated; and wherein causing the additional data to be requested is done automatically in response to receiving the notification.

14. The one or more non-transitory computer-readable media of claim 9, wherein determining delivery hit rates for each of the two or more second databases comprises calculating a ratio of successful deliveries to total delivery attempts based on the additional data.

15. A method featuring an improvement in data processing and computer efficiency, the method comprising:

receiving a digital image of undeliverable mail and storing the digital image in a first database;

causing data to be extracted from the digital image using Optical Character Recognition (OCR) or by processing encoded data;

in response to causing data to be extracted from the digital image, identifying a sender of the undeliverable mail and a recipient of the undeliverable mail based on the data;

causing additional data to be requested from two or more second databases based on the data extracted from the digital image;

in response to delivery of the undeliverable mail, and using the additional data requested from the two or more second databases, determining delivery hit rates for each of the two or more second databases;

assigning, based on a highest hit rate of the delivery hit rates, at least one of the two or more second databases as a primary database from which additional data is requested; and in response to assigning the at least one of the two or more second databases as the primary database, causing additional data to be requested from the primary database.

16. The method of claim 15, further comprising:
causing printing of the additional data on a piece of mail using a printing device associated with the sender.

17. The method of claim 16, wherein the two or more second databases comprise two or more address correction databases.

18. The method of claim 17, wherein the data from the digital image comprises a recipient address, and wherein the additional data from the two or more second databases comprises an updated recipient address.

19. The method of claim 18, further comprising:
receiving a notification that the additional data to be requested from the two or more second databases has been updated; and
wherein causing the additional data to be requested is done automatically in response to receiving the notification.

20. The method of claim 19, wherein determining delivery hit rates for each of the two or more second databases comprises calculating a ratio of successful deliveries to total delivery attempts based on the additional data.

* * * * *